3,546,974
TRANSMISSION CONTROL SYSTEM

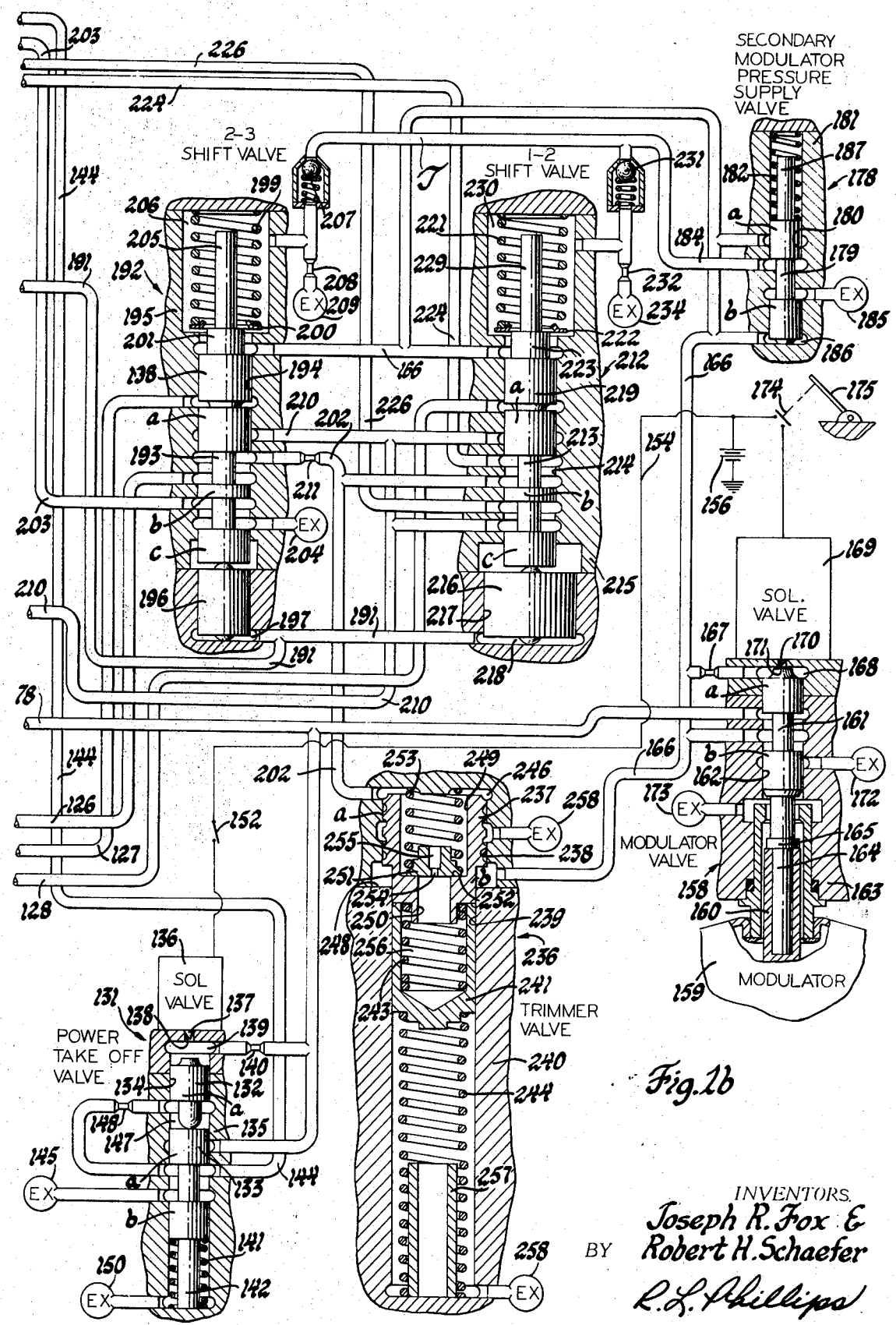

Joseph R. Fox, Indianapolis, and Robert H. Schaefer, Westfield, Ind., assignors to General Motors Corporation, Detroit, Mich., a corporation of Delaware
Filed May 26, 1969, Ser. No. 827,623
Int. Cl. F16h 37/00; B60k 21/08
U.S. Cl. 74—869                                6 Claims

ABSTRACT OF THE DISCLOSURE

A vehicle transmission control system having a modulator valve controlled by a vacuum modulator and a throttle operated solenoid valve to provide a shift control pressure increasing with engine torque demand to detent and the highest shift control pressure through detent, a trimmer valve controlling drive establishing device torque capacity during drive establishment according to engine torque demand and an auxiliary power take off valve controlling the operation of an auxiliary drive establishing device with a lowered regulated pressure.

---

Figure 1A:
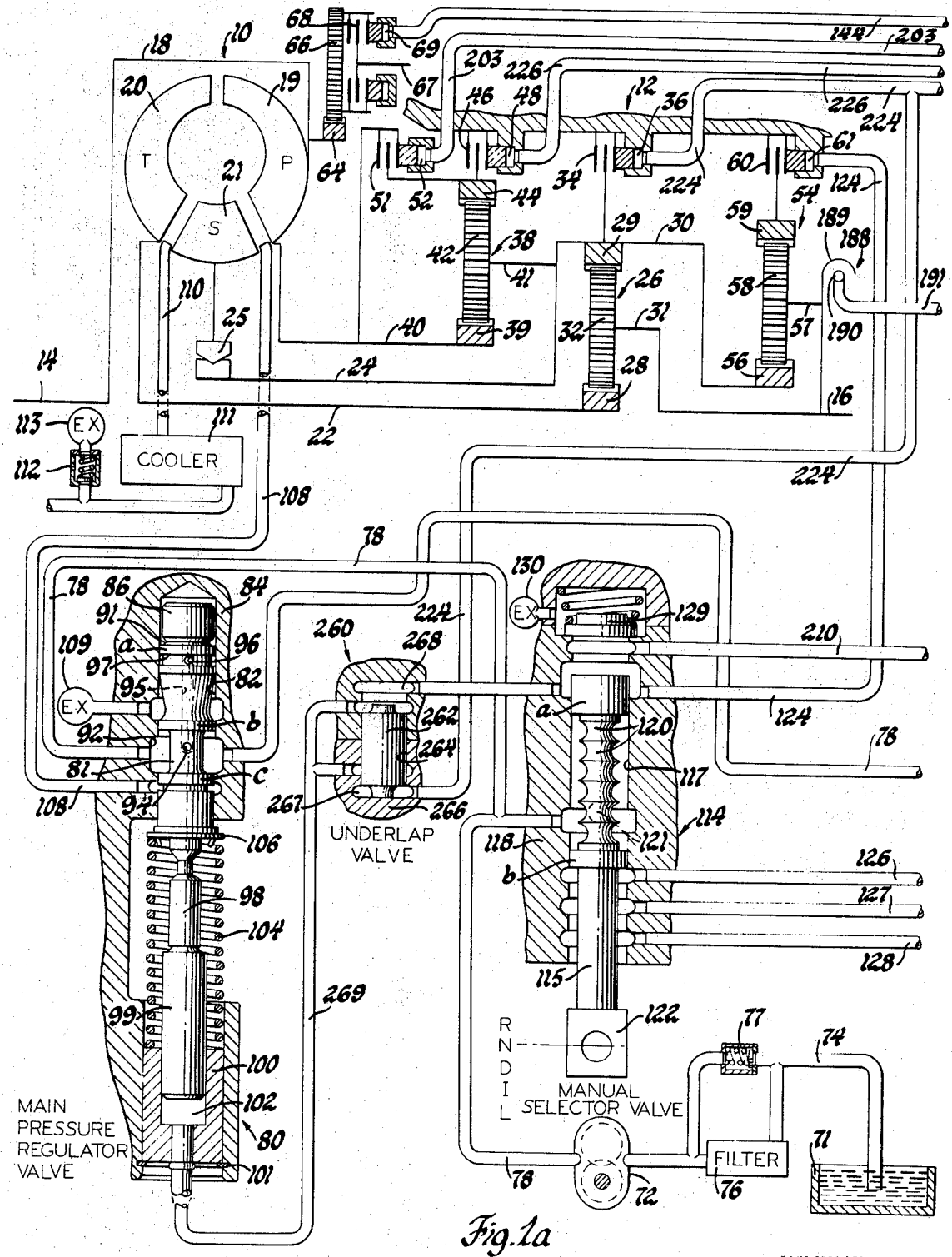

This invention relates to control systems and more particularly to control systems for controlling vehicle transmissions having an auxiliary power take off.

In automatic vehicle transmissions in general it is desirable that where forced downshifting is provided, the control for such operation be both simple and easily adaptable to different locations of the transmission relative to the passenger compartment where the accelerator pedal is used to originate the signal for such shifting. It is also desirable that the shifts between those drives experiencing large torque demand be very smooth. Furthermore, in transmissions having an auxiliary power take off, it is desirable that the control for such drives again be both simple and easily adaptable to different transmission locations. In addition, it is desirable that the auxiliary drive be engageable at the will of the operator with the drive establishing device for this drive having an engagement capacity matched to the auxiliary load.

The vehicle transmission control system according to the present invention as illustrated in the preferred embodiment has a modulator valve, also called a TV valve, controlled by both a vacuum modulator and a solenoid valve which is operated from the throttle pedal. The modulator valve provides a shift control pressure, also called TV pressure, increasing with increasing torque demand to throttle pedal detent and establishes TV pressure at maximum system pressure through detent. A trimmer valve whose operation is modulated by the TV pressure provides for gradually increasing the torque capacity of certain of the transmission's drive establishing devices during their engagement to provide smooth engagement according to torque demand on shifting between such drives. The operation of the trimmer valve acts to increase the trim pressure level with increasing engine torque demand with the time of pressure build up to full pressure decreasing with increasing torque demand. A power take off valve is controllable by the operator in neutral and all transmission drives to selectively effect establishment of a power take off drive, also called an auxiliary drive, and also regulates the pressure for such drive establishment at a value determined to provide an engagement capacity for this drive according to the auxiliary load.

An object of the present invention is to provide a new and improved control system for an automatic transmission.

Another object is to provide in a transmission control system a modulator valve controlled by a vacuum modulator and an engine throttle operated solenoid valve to provide a shift control pressure increasing with increasing engine torque demand to throttle detent and to establish the control pressure at maximum pressure through hrottle detent.

Another object is to provide in a transmission control system a trimmer valve for increasing the torque capacity of a transmission drive during its engagement with increasing engine torque demand to provide smooth engagement of the drive according to the load.

Another object is to provide in a transmission control system a power take off valve for selectively establishing engagement of a power take off drive and determining the engagement capacity of this drive.

Another object is to provide in a transmission control system the combined features of a modulator valve controlled by a vacuum modulator and a throttle operated solenoid valve to provide a shift control pressure increasing with increasing engine torque demand to throttle detent and to establish the control pressure at maximum pressure through throttle detent, a trimmer valve biased by the shift control pressure for increasing the torque capacity of a transmission drive during its engagement with increasing engine torque demand to provide smooth engagement of the drive according to the load and a power take off valve for selectively establishing engagement of power take off drive and determining the engagement capacity of this drive with a pressure lower than the available pressure.

These and other objects of the invention will be more apparent from the following description and drawing in which:

The drawing diagrammatically shows a transmission with a control system according to the present invention when FIGS. 1a and 1b are arranged in accordance with the diagram shown in FIG. 1.

TRANSMISSION DRIVE TRAIN

The control system according to the present invention is particularly suited for controlling vehicle transmissions of the type disclosed in the Tuck et al. U.S. Pat. No. 3,371,555 issued Mar. 5, 1968. The transmission drive train generally comprises a hydrodynamic torque converter 10 and range unit 12 cooperating to provide three forward drives and one reverse drive between the transmission's input shaft 14 and output shaft 16. In the vehicle installation the input shaft 14 is driven by the vehicle's engine (not shown) and the output shaft 16 is connected to drive the vehicle's propelling wheels (not shown).

In converter 10 the input shaft 14 is connected by a housing 18 to a pump 19 (P). Housing 18 generally provides a rotating torque converter housing enclosing the torque converter members which in addition to the pump 19 include a turbine 20 (T) and stator 21 (S). Turbine 20 is connected to a turbine shaft 22 extending out of the converter for connection to the range unit. Stator 21 is connectible to a sleeve shaft 24 surrounding turbine shaft 22 by a one-way clutch 25 which prevents the stator from rotating relative to shaft 24 in a direction opposite the forward direction of pump 19 while permitting opposite relative rotation. The converter members are of conventional design and provide a toroidal fluid path with torque multiplication being made available by the stator by its one-way connection with the range unit as described in more detail later.

The range unit 12 has a low ratio planetary gear set 26 comprising a sun gear 28 connected to turbine shaft 22, a ring gear 29 carried on a drum 30 which is connected to sleeve shaft 24, and a carrier 31 carrying pinions 32 meshing with sun gear 28 and ring gear 29. The carrier 31 is directly connected to output shaft 16. A low drive brake 34 having friction plates which are engaged by a low drive fluid motor 36 is for braking ring gear 29 to establish a low speed forward drive between input shaft 14 and output shaft 16.

An intermediate ratio gear set 38 has a sun gear 39 which is connected to converter housing 18 and thus to input shaft 14 by a sleeve shaft 40 surrounding sleeve shaft 24. A carrier 41 is connected to drum 30 and thus to both the low ratio ring gear 29 and sleeve shaft 24 and carries pinions 42 which mesh with sun gear 39 and a ring gear 44. An intermediate drive brake 46 having friction plates which are engaged by an intermediate drive fluid motor 48 is for braking ring gear 44 to establish an intermediate speed forward drive between input shaft 14 and output shaft 16.

Lockup of gear set 38 provides a direct drive between the input driven shaft 40 and carrier 41 and a high speed forward drive between input shaft 14 and output shaft 16. This is established by a high drive clutch 51 having friction plates which are engaged by a high drive fluid motor 52, this engagement connecting sleeve shaft 40 to ring gear 44 to effect the lockup of gear set 38.

A reverse drive between input shaft 14 and output shaft 16 is provided by a planetary gear set 54 which has a sun gear 56 connected to drum 30 and thus to sleeve shaft 24. A carrier 57 connected to output shaft 16 carries pinions 58 which mesh with sun gear 56 and a ring gear 59. Ring gear 59 is braked by a reverse drive brake 60 having friction plates which are engaged by a reverse drive fluid motor 61 to establish the reverse drive.

With this transmission drive arrangement it will be appreciated that only one fluid motor is operated to provide each drive. For a more detailed description of the operations of the converter and gearing combination, reference may be made to the aforementioned Tuck et al. patent.

The transmission in addition to the main drives described above has an auxiliary or power take off drive for powering auxiliary vehicle equipment, which in the case of trucks may be a loader, for example. This power take off drive is provided by an annular spur gear 64 which is connected to converter housing 18 and thus to input shaft 14 so that it rotates at engine speed. Gear 64 meshes with a spur gear 66 which is clutched to an auxiliary or power take off shaft 67 by a clutch 68 having friction plates which are engaged by an auxiliary or power take off fluid motor 69. The power take off shaft 67 is connected to drive the auxiliary equipment (not shown) which thus may be selectively powered.

The friction drive establishing devices and fluid motors for the main drives and the auxiliary drive are of conventional design. Each motor has an annular piston which is restrained against rotation with respect to its cylinder and a suitable retraction spring for releasing engagement upon pressure exhaust of the motor.

TRANSMISSION CONTROL SYSTEM

The present invention is embodied in the transmission control system shown in FIGS. 1a and 1b which is adapted to control transmission drive train arrangements having a power take off drive of the type shown. The transmission control system is operable to provide selection of automatic shifting between all forward drives and also between only the two lowest forward drives while preventing engagement of the highest forward drive after it has been automatically released. The control system is also operable to provide selection of the lowest forward drive while preventing engagement of the higher drives after they have been automatically released. In addition, the control system provides selection of neutral, the reverse drive and the power take off drive.

PUMP

The fluid such as oil used in the control system is returned to a sump 71 via various exhausts in the system's components. Fluid pressure for the control system is supplied by a positive displacement pump 72 of the gear type which is driven by the input shaft 14 and thus by the vehicle's engine. The engine driven pump 72 draws fluid from sump 71 through an intake line 74. A filter 76 and check valve 77 are connected in parallel in the pump's intake line 74 so that the fluid drawn from the sump is normally filtered, but in the event the filter collects excessive foreign material, check valve 77 opens to provide a bypass for maintaining the fluid supply without excessive flow restriction. Fluid under pressure from pump 72 is delivered to a main line 78.

MAIN PRESSURE REGULATOR VALVE

A main pressure regulator valve 80 regulates the pressure in main line 78 at a low value when there are low duty requirements imposed on the transmission and at a high or boosted value when there are high transmission duty requirements. The main pressure regulator valve 80 comprises a spool valve element 81 having three spaced lands $a$, $b$ and $c$ of equal diameter located in a bore 82 of valve body 84. A limit plug 86 located in the upper end of bore 82 limits upward travel of valve element 81 toward this end which is closed to provide a chamber 91. The main line 78 is continuously connected through the valve body 84 and to an annular port 92 as shown which port is continuously open to the area on valve element 81 between lands $b$ and $c$. Chamber 91 is continuously connected to this same area between lands $b$ and $c$ through a radially extending flow restriction passage 94 and an axially extending central passage 95 in valve element 81. A radially extending port 96 connected to passage 95 is for delivering fluid to an annular channel 97 in land $a$ so that valve element 81 rides on a film of fluid for easy movement.

At the other end of valve element 81 there is an integral axially extending stem 98 contactable with a pressure boost piston 99 which is mounted in a cylinder 100. Cylinder 100 is mounted in the valve body and retained by a retainer ring 101. The piston 99 and cylinder 100 cooperatively provide an expansible chamber 102 which is supplied with fluid pressure to boost regulator pressure as described in more detail later. Valve element 81 is biased upward by a regulator spring 104 mounted between the annular end of cylinder 100 and a spring seat 106 abutting a shoulder of valve element 81.

The valve element 81 is normally biased to the position shown by spring 104 and with pressure supplied to main line 78 and thus between the lands $b$ and $c$, this pressure is delivered to chamber 91. The pressure in chamber 91 urges downward movement of valve element 81 against the spring bias to regulate pressure in main line 78 at a low value determined by the spring bias with the overage being exhausted first between lands $b$ and $c$ to a converter feed line 108 and then between lands $a$ and $b$ to an exhaust 109 on continued downward valve element movement.

The above described main pressure regulation assumes that only spring 104 is determining the main pressure. When the control system is conditioned to establish either low or reverse drive, a pressure signal at main pressure is delivered to chamber 102 as described in more detail later. This pressure acts upward on piston 99 whose pressure responsive area is smaller than that on the upper end of valve element 81. The resulting smaller force provided by this pressure differential urges valve element 81 downward against spring 104 to establish a boosted or high pressure in main line 78.

The converter feed line 108 delivers overage fluid to the converter 10 for its operation and with the converter filled, fluid from the converter is delivered to a converter return line 110. Line 110 directs the fluid through a cooler 111 and then to lubricate various components of the transmission prior to being returned to sump 71. A relief valve 112 limits lubrication pressure with overage being directed to an exhaust 113.

MANUAL SELECTOR VALVE

Main line 78 supplies main pressure to a manual selector valve 114 which comprises a spool valve element 115 having spaced lands $a$ and $b$ of equal diameter located in bore 117 of valve body 118. A plurality of annular grooves 120 between lands $a$ and $b$ cooperate with a spring biased ball detent 121 to yieldingly hold the valve in each of five positions which are Reverse (R), Neutral (N), Drive (D), Intermediate (I) and Low (L). Valve element 115 is adapted at end 122 to be operated through suitable linkage by the operator of the vehicle who manually selects the valve's position.

In the Neutral or N position shown, main line 78 is blocked by bore 117 between lands $a$ and $b$ so that delivery of main pressure from the valve is thus blocked. When valve element 115 is moved to the Reverse or R position, main line 78 is connected between lands $a$ and $b$ to a reverse drive feed line 124 which is directly connected to the reverse drive fluid motor 61. When valve element 115 is moved to the Drive or D position, main line 78 is connected between lands $a$ and $b$ to a range feed line 126 which provides main pressure feed for automatic shifting between all of the forward drives as described in more detail later. When valve element 115 is moved to the Intermediate or I position, main line 78 remains connected to the range feed line 126 and is additionally connected to an intermediate drive signal line 127 to provide for automatic shifting between the low and intermediate drive while preventing engagement of the high drive after it has been automatically released as described in more detail later. When valve element 115 is moved to the Low or L position, main line 78 remains connected to both the range feed line 126 and intermediate drive signal line 127 and is in addition connected to a low drive signal line 128 to provide for establishment and maintenance of low drive as described in more detail later. In Neutral, Drive, Intermediate and Low position, land $a$ blocks main line 78 from reverse drive feed line 124 which in each of these positions is connected by a relief valve 129 to an exhaust 130. Relief valve 129 is set to open at a pressure low enough to permit the reverse drive fluid motor 61 to release the reverse drive on movement of the manual selector valve element 115 from its Reverse position while maintaining the reverse drive fluid circuit full of fluid to prevent delay in re-engagement. Relief valve 129 provides a similar function for the low and intermediate drive fluid circuits when these respective drives are released.

POWER TAKE OFF VALVE

The main line 78 is also connected to a power take off valve 131. Valve 131 controls delivery of main line fluid to operate the power take off clutch motor 69 and in addition regulates the pressure delivered to this motor at a predetermined value. This predetermined value is lower than main pressure to match the engagement capacity of the power take off clutch to its auxiliary load which is generally lower than the load on the transmission's output shaft 16. The power take off valve 131 comprises a control valve element 132 with a single land $a$ and a directional-regulator spool valve element 133 having a pair of spaced lands $a$ and $b$ all located in bore 134 of valve body 135, all of these lands being of equal diameter.

A solenoid valve 136 which may be conventional is secured to the valve body and has a valve element 137 which, when the solenoid valve is de-energized, closes an exhaust port 138 connected to a chamber 139 above control valve element 132. Main line 78 is connected through a flow restriction 140 to chamber 139 and with the solenoid valve de-energized, pressure builds in chamber 139 to full main pressure to urge valve elements 132 and 133 downward to the positions shown against the bias of a spring 141. These positions are determined by a projection 142 on the lower end of valve element 133 bottoming out on the valve body. This places the directional-regulator valve element 133 in a release position in that its land $a$ blocks main line 78 from a power take off clutch feed line 144 which is connected to power take off clutch motor 69. The power take off clutch feed line 144 is connected between lands $a$ and $b$ of valve element 133 in the release position to an exhaust 145 so that the power take off clutch 68 is disengaged or released.

Alternatively, when solenoid valve 136 is energized, the exhaust port 138 is opened by solenoid valve element 137 so that chamber 139 is relieved of pressure with the flow restriction acting to maintain main pressure in main line 78 upstream of valve 131 during such operation. With chamber 139 relieved of pressure, spring 141 acting on valve element 133 urges the other valve element 132 upward to a stop position against the valve body. Valve element 132 then acts as a stop for valve element 133 which is then conditioned to provide connection of main line 78 to power take off clutch feed line 144 to engage the power take off clutch 68. In this condition, the connection between lines 78 and 144 is provided by the space between lands $a$ and $b$ of valve element 133 with the downstream line 144 continuously connected to this space. The space 147 between valve elements 132 and 133 is contiuously connected to the space between lands $a$ and $b$ of valve element 133 and thus line 144 through a flow restriction 148. Pressure in line 144 acts downward in chamber 147 on valve element 133 to regulate the pressure in this line in accordance with the bias of spring 141 with the overage resulting from this regulation being delivered between lands $a$ and $b$ to the exhaust 145. An exhaust 150 exhausts leakage past land $b$ to prevent hydraulic lock.

The solenoid valve 136 is operated by a manual switch 152 located in the vehicle operator's compartment. This switch on closure by the vehicle operator connects an electrical line 154 to deliver power to solenoid valve 136 from a suitable electrical power source such as the vehicle's battery 156.

MODULATOR VALVE

The main line 78 is also connected to modulator valve 158. Modulator valve 158 provides a throttle or TV pressure for controlling shifting which pressure increases with increasing engine torque demand and past full engine throttle opening or what is commonly referred to as "through detent" increases this TV pressure to full main pressure. Modulator valve 158 is controlled by a vacuum modulator 159 which is connected to the engine's intake manifold and is preferably of the ambient atmospheric pressure compensated type shown in Ronald C. Groves U.S. Pat. No. 3,295,388 issued Jan. 3, 1967. Vacuum modulator 159 provides an upwardly acting modulator output force on a sleeve 160 which force increases with decreasing intake manifold pressure or engine torque demand with correction for changes in manifold vacuum resulting from changes in ambient atmospheric pressure. For a more detailed description of the operation of the vacuum modulator, reference may be made to the aforementioned Groves patent.

The modulator valve 158 comprises a spool valve element 161 having spaced lands $a$ and $b$ of equal diameter located in bore 162 of valve body 163. Valve element 161 also has a stem 164 received in sleeve 160 of modulator 159 and a collar 165 engaged by the sleeve so that the modulator output force biases valve element 161 upward. A TV line 166 is connected to bore 162 always between lands $a$ and $b$ and is in addition always connected through a flow restriction 167 to a chamber 168 at the upper end of valve element 161. A solenoid valve 169 which may be conventional is secured to the valve body and has a valve element 170. When the solenoid valve 169 is de-energized, as shown, valve element 170 closes an exhaust port 171 from chamber 168. When solenoid valve 169 is energized the valve element 170 is moved to open the exhaust port 171.

When valve element 161 is in the position shown the main line 78 is connected past the edge of land *a* and between lands *a* and *b* to the TV line 166. Fluid in TV line 166 is delivered through flow restriction 167 to chamber 168 and with solenoid valve 169 de-energized, pressure builds in the thus closed chamber to urge valve element 161 downward against the upward bias from modulator 159. With sufficient downward movement of valve element 161, land *a* blocks main line 78 while connecting the downstream TV line 166 to an exhaust 172. Assuming a constant upward biasing force from modulator 159, modulator valve 158 provides a regulated TV pressure in TV line 166 determined by this modulator bias. Varying modulator bias varies TV pressure and the modulator valve 158 as constructed increase TV pressure in TV line 166 from a suitable minimum value to a suitable maximum value with increasing engine torque demand provided solenoid valve 169 is de-energized. An exhaust 173 exhausts leakage past land *b* to prevent hydraulic lock. Energization of solenoid valve 169 opens exhaust port 171 to relieve chamber 168 of pressure to permit valve element 161 to be urged upward to the position shown by whatever modulator bias exists to provide an open connection between main line 78 and TV line 166 so that the latter line then receives full main pressure.

The solenoid valve 169 is operated by a switch 174 which controls the connection of the electrical line 154 to this valve. The switch 174 is arranged relative to the engine throttle pedal 175 so that it is normally open to de-energize solenoid valve 169 at all engine throttle positions between idle and wide open or full throttle. When throttle pedal 175 is depressed past wide open throttle (through detent) it then closes switch 174 to energize solenoid valve 169.

SECONDARY MODULATOR PRESSURE SUPPLY VALVE

The TV line 166 is connected to a secondary pressure modulator supply valve 178 which provides for delayed upshifting and enforced or early downshifting. This valve comprises a spool valve element 179 having spaced lands *a* and *b* of equal diameter located in bore 180 of valve body 181. A spring 182 normally biases valve element 179 downward to the closed position shown where land *a* blocks connection between TV line 166 while a T line 184 is connected between lands *a* and *b* to an exhaust 185. The TV line 166 is connected to a chamber 186 so that TV pressure acts upward on valve element 179 against the bias of spring 182. When the pressure force is sufficient to move the valve element upward to an open position determined by stem 187 contacting the valve body, the TV line 166 is then connected between lands *a* and *b* to the T line 184 while land *b* blocks T line 184 from exhaust 185. The pressure delivered to T line 184 is thus equal to TV pressure and will be referred to as T pressure. The availability of T pressure is determined by the upward force required to open valve 178 which is made to occur at a predetermined intermediate TV pressure. Thus the T pressure is available at this predetermined intermediate TV pressure and remains available throughout the remainder of the TV pressure range to the highest TV pressure.

GOVERNOR

The control system has one governor 188 of the Pitot type providing a governor pressure proportional to vehicle speed for controlling shifting. The governor 188 has an annular trough 189 which is connected to carrier 57 of the reverse gear set 54 and is thus rotated at the speed of output shaft 16. Trough 189 is suitably supplied with fluid such as from the lubrication circuit which is fed by the converter return line 110. With forward rotation of output shaft 16 and thus forward rotation of trough 189, the fluid in the trough impinges on the end of a Pitot tube 190 to provide in a governor line 191 a governor pressure which increases with increasing transmission output speed and thus with vehicle speed.

2-3 SHIFT VALVE

An intermediate-high or 2-3 shift valve 192 controls shifts between intermediate and high drive and also determines whether low and intermediate drive can be established. The valve comprises a spool valve element 193 having spaced lands *a*, *b* and *c* which may be of equal diameter located in bore 194 of valve body 195. A governor plug 196 is located in the lower end of bore 194 which is closed to provide a chamber 197 that is connected to governor line 191. A downshift plug 198 is located in the upper end of valve bore 194 and is urged downward by a spring 199. Spring 199 is seated at its upper end on the valve body and at is lower end on a spring seat 200 which abuts a shoulder 201 of reduced diameter on downshift plug 198. Spring 199 normally biases the downshift plug 198 and contacting valve element 193 downward and the latter's contract with governor plug 196 positions these members as shown which is the downshift position.

In the downshift position the range feed line 126 is connected between lands *a* and *b* to a 1-2 feed line 202 while a high drive clutch feed line 203 is connected between lands *b* and *c* to an exhaust 204. The high drive clutch feed line 203 is connected to the high drive fluid motor 52 which is thus exhausted to disengage the high drive clutch 51. In the downshift position the intermediate drive signal line 127 is connected at bore 194 between downshift plug 198 and valve element 193 so that when main pressure is available to this signal line it is directed to act downward on the upper end of valve element 193 to hold the valve in its downshift position.

Governor pressure in chamber 197 acts on governor plug 196 to urge upward movement of valve element 193 towards its upshift position which is determined by stem 205 of downshift plug 198 contacting the valve body. This upshift speed governed bias is resisted by the bias of spring 199 and a torque demand downshift pressure bias which is provided by TV pressure in the downshift position and by T pressure in both the upshift and downshift position when the latter pressure is available. This downshift pressure bias is effected by connection of TV line 166 past downshift plug 198 in the downshift position to a chamber 206 above this plug so that TV pressure acts on the full end area of this plug only when the valve is in its downshift position. For the T pressure downshift bias, the T line 184 is connected through a ball check valve 207 to chamber 206 which is always connected through a flow restriction 208 to an exhaust 209. The flow restriction 208 maintains the downshift pressure bias as long as there is fluid supply to chamber 206 while check valve 207 prevents TV pressure from reaching T line 184 when no T pressure exists.

Upshifting occurs when the governor pressure bias on governor plug 196 is greater than the downshift bias of spring 199 and TV pressure acting on downshift plug 198. On the upshift position, downshift plug 198 blocks TV line 166 from chamber 206 so that the 198 blocks TV line 166 from chamber 206 so that the TV pressure previously acting on this plug is then relieved through flow restriction 208 by exhaust 209. In the upshift position, land *a* blocks the intermediate drive signal line 127, land *c* blocks exhaust 204 and the range feed line 126 is connected between lands *b* and *c* to the high drive clutch feed line 203 to engage the high drive clutch 51. The 1-2 feed line 202 is connected between lands *a* and *b* in the upshift position to a 1-2 exhaust line 210 which serves both the low drive fluid motor 36 and the intermediate drive fluid motor 48 as described in more detail later. The 1-2 exhaust line 210 is blocked by land *a* in the downshift position.

When vehicle speed reduces sufficiently for the bias provided by spring 199 to overcome the governor pressure bias, the 2-3 shift valve downshifts. In the downshift position, TV pressure from TV line 166 is restored to act on downshift plug 198. Downshifting is accelerated or made to occur earlier than the fixed downshift condition described above when there is large torque demand. This is provided by the use of T pressure from T line 184 which acts on the downshift plug 198 to provide a downshift bias which is greater than the bias of spring 199 and increases with torque demand. Thus, whenever T pressure is made available, a downshift is made to occur earlier than it normally would without the added T pressure bias. Furthermore, upshifting is delayed when there is large torque demand by the T pressure downshift bias.

1-2 SHIFT VALVE

The 1-2 feed line 202 from the 2-3 shift valve 192 is connected through a flow restriction 211 to a 1-2 shift valve 212 which controls shifts between low and high drive. The 1-2 shift valve 212 has valve elements similar to those of the 2-3 shift valve comprising a spool valve element 213 having spaced lands $a$, $b$ and $c$ which may be of equal diameter located in bore 214 of valve body 215. The diameter of these lands may be equal to that of the lands of the corresponding valve element 193 in the 2-3 shift valve. The lower end of valve element 213 is contacted by a governor plug 216 which has a larger diameter than the corresponding governor plug 196 of the 2-3 shift valve. Governor plug 216 is located in an enlarged bore 217 and in cooperation with the closed lower end of the valve body defines an expansible chamber 218 which is connected to governor line 191. Located in the upper end of valve bore 214 is a downshift plug 219 which contacts the upper end of valve element 213. Plug 219 is biased downward by a spring 221 which is located between the valve body and a spring seat 222 abutting shoulder 223 on downsihft plug 219.

The 1-2 shift valve 212 in the downshift position shown connects the 1-2 feed line 202 between lands $a$ and $b$ to a low drive brake feed line 224 which is connected to the low drive fluid motor 36. An intermediate drive brake feed line 226 connected to the intermediate drive fluid motor 48 is connected between lands $b$ and $c$ to the 1-2 exhaust line 210 while land $a$ blocks the low drive brake feed line 224 from this exhaust line. Also in the downshift position, the low drive signal line 128 is connected to bore 214 between downshift plug 219 and valve element 213 so that when pressure is available to this signal line it acts downward on the upper end of valve element 213.

The 1-2 exhaust line 210 which is blocked by land $a$ of the 2-3 shift valve 192 in the downshift position is always connected at the manual selector valve 114 by the upper end of bore 117 to the pressure relief valve 129 so that the 1-2 exhaust line 210 is relieved of pressure delivered thereto by either the 1-2 shift valve 212 or 2-3 shift valve 192 down to the pressure setting of relief valve 129. This provides sufficient pressure relief of both the low drive fluid motor and intermediate drive fluid motor to permit release of their respective drive brakes while maintaining the lines to these motors filled with fluid for subsequent operation without delay.

Governor pressure acts in chamber 218 on the lower end of governor plug 216 to urge upward movement of valve element 213 to an upshift position which is determined by stem 229 of downshift plug 219 contacting the valve body. This output speed governed bias is resisted by the bias of spring 221 and a torque demand downshift pressure bias which is provided by TV pressure in the downshift position and by T pressure in both the upshift and downshift position when the latter pressure becomes available. This downshift pressure bias is effected by connection of TV line 166 past downshift plug 219 in the downshift position to a chamber 230 above this plug so that TV pressure acts on the full end area of this plug only when the valve is in its downshift position. For the T pressure downshift bias, the T line 184 is connected through a ball check valve 231 to chamber 230 which is always connected through a flow restriction 232 to an exhaust 234. The flow restriction 232 maintains the downshift pressure bias as long as there is fluid supplied to chamber 230 while check valve 231 prevents TV pressure from reaching T line 184 when no T pressure exists.

Upshifting occurs when governor pressure acting on spring 221 and TV pressure acting on downshift plug 219. In the upshift position, downshift plug 219 blocks governor plug 216 is greater than the downshift bias of previously acting on this plug is then relieved through TV line 166 from chamber 230 so that the TV pressure flow restriction 232 by exhaust 234. In the upshift position, the 1-2 feed line 202 is connected between lands $b$ and $c$ to the intermediate drive brake feed line 226 and the low drive brake feed line 224 is connected between lands $a$ and $b$ to the 1-2 exhaust line 210 while land $a$ blocks the low drive signal line 128.

When vehicle speed reduces sufficiently for the bias provided by spring 221 to overcome the governor pressure bias, the 1-2 shift valve 212 downshifts. In the downshift position TV pressure is restored to act on the downshift plug 219. Like the 2-3 shift valve 192, downshifting is made to occur early and upshifting is delayed by the 1-2 shift valve 212 when there is large torque demand by T pressure acting on the downshift plug 219, this downshift pressure bias being greater than the bias of spring 221.

TRIMMER VALVE

A trimmer valve 236 controls the rate of pressure increase in the 1-2 feed line 202 and thus in the low drive fluid motor 36 and intermediate drive fluid motor 48 to control the rate of force applied to engage the respective low drive brake 34 and intermediate drive brake 46. The trimmer valve 236 comprises a spool valve element 237 having a large land $a$ and small land $b$ located in accommodating connected bores 238 and 239 of valve body 240. A cup-shaped plug 241 is located wholly within the smaller diameter bore 239 and is positioned between valve element 237 and the valve body at the lower end of bore 239. A spring 243 is located between the closed lower end of plug 241 and valve element 237 and another spring 244 is held in compression between plug 241 and the valve body at the lower end of bore 239. The 1-2 feed line 202 is connected between flow restriction 211 and the 1-2 shift valve 212 to a chamber 246 above valve element 237 and in the absence of pressure in this chamber, the spring 244 has sufficient force to compress spring 243 so that plug 241 at its open upper end contacts valve element 237 which in turn contacts the valve body at the closed upper end of bore 238 all as shown.

The TV line 166 is connected at the step 248 between bores 238 and 239 so that TV pressure biases valve element 237 upward, the pressure responsive area being the difference in end areas of lands $a$ and $b$. The valve element 237 is hollow having a central large bore 249 at the upper end connected to a central small bore 250 at the lower end. A valve element 251 located in large bore 249 is yieldingly held in sealing contact with step 252 between bores 249 and 250 by a spring 253 which is located between this valve element and the valve body at the upper end of bore 238. A flow restriction 254 in valve element 251 permits fluid to pass slowly from chamber 246 through bore 249 and a port 255 into expansible chamber 256 between valve element 237 and plug 241.

When full main pressure exists in the 1-2 feed line 202 which occurs when either the low or intermediate drive is engaged and there is a steady state condition, this pressure is present in both chambers 246 and 256. Main pressure in chamber 256 is sufficient to bias plug 241 downward against spring 244 to a position contacting a stop member 257, an exhaust 258 exhausting any leakage from chamber 256 past plug 241. In the thus expanded chamber 256 the spring 243 has sufficient compression so that its force on valve element 237 combined with the minimum TV pressure bias overcomes the opposing downward bias provided by main pressure acting on the differential end area between lands *a* and *b* to position valve element 237 as shown with the other valve element 251 held against its seat by spring 253. The valve element 237 in this position blocks chamber 246 from an exhaust 258. The above condition of trimmer valve 236 will be described as the steady state shifted condition. In neutral and also when either the high drive or reverse drive is engaged, the 1-2 feed line 202 is relieved of main pressure and all the trimmer valve members are positioned as shown which will be described as the steady state neutral condition.

Upon initial establishment of main pressure delivery to the 1-2 feed line 202 to engage either low or intermediate drive with trimmer valve 236 in its steady state neutral condition, the pressure in the 1-2 feed line will build slowly to full main pressure at which latter time the trimmer valve 236 will obtain its steady state shifted condition and the friction drive engaging device being operated is engaged by the full engagement or apply force. During this transition the trimmer valve 236 controls pressure buildup in the 1-2 feed line 202 and thus in the fluid motor of the friction drive engaging device being operated. This is effected by the initial delivery of pressure in the 1-2 feed line immediately downstream of flow restriction 211 to chamber 246 which urges both the valve element 237 and plug 241 downward against the bias of spring 244 to open chamber 246 to exhaust 258 to establish a low limit of regulated pressure level, also called trim level, in the 1-2 feed line 202 downstream of flow restriction 211. The TV bias which adds to the regulating bias provided by spring 244 acts to increase the trim pressure level with increasing engine torque demand to thus provide more torque capacity in the friction drive establishing device being operated according to increased torque demand. Fluid will gradually flow through flow restriction 254 to chamber 256 urging separation of valve element 237 and plug 241 with the valve element urged upward and the plug urged downward. This has the effect of increasing the upward regulating bias on valve element 237 thus requiring an increase in pressure in chamber 256 to hold this chamber open to exhaust 258. This increase in the regulating bias continues until plug 241 contacts the stop 257 at which time the pressure in chamber 256 has built to full main pressure and this upward acting main pressure bias plus the bias of spring 243 and the TV bias holds valve element 237 against the downward main pressure bias in the closed position shown blocking exhaust 258.

Rapid return of the trimmer valve 236 to the steady state neutral condition at the initiation of shifts between the low drive and intermediate drive is provided by operation of the valve element 251. The valve element 251 moves upward against the bias of spring 253 to fully open bore 250 to chamber 246 on a decrease in pressure in the 1-2 feed line 202 downstream of flow restriction 211 which occurs on the initiation of such shifts and is effected by the pressure differential developed across flow restriction 254 with chamber 256 at that time containing full main pressure. This permits rapid conditioning of the trimmer valve 236 in the steady state neutral condition so that it is ready to trim the feed pressure to the fluid motor being operated as the shift continues.

UNDERLAP VALVE

An underlap valve 260 controls the delivery of low and reverse drive feed pressure to the main pressure regulator valve 80 for boosting main pressure in both the reverse and the low drive. This valve compises a valve element 262 located in a valve bore 264 of valve body 266. The low drive brake feed line 224 and reverse drive brake feed line 124 are connected to chambers 267 and 268, respectively, at the opposite closed ends of bore 264 and a boost signal line 269 is connected to the valve bore 264 at two intermediate points as shown. When reverse drive is engaged the main pressure in the reverse drive brake feed line 124 is also delivered to act in chamber 268 to urge valve element 262 downward to the position shown connecting the reverse drive brake feed line 124 to boost signal line 269. Thus, main pressure is delivered to chamber 102 in the main pressure regulator valve 80 to provide main pressure boost for the reverse drive. In this valve position, valve element 262 blocks boost signal line 269 from the low drive brake feed line 224 to prevent engagement of the low drive brake 34. Alternatively, when low drive is engaged the main pressure in low drive brake feed line 224 is also delivered to act in chamber 267 to move valve element 262 upward to connect the low drive brake feed line 224 to the boost signal line 269 to boost main pressure while blocking the latter line from the reverse drive brake feed line 124 to prevent engagement of the reverse drive brake 60.

CONTROL SYSTEM OPERATION

The control system thus far described is operable to provide manual selection of neutral and the reverse drive and automatic shifting between all forward drives. The control system is also operable to limit shifting to just between the intermediate and low drive and also provides for holding the low drive. Furthermore, the control system provides for manual selection of the power take off drive at all times.

For neutral, the operator places the manual selector valve 114 in its N position and with the engine operating to drive the pump 72, the main pressure regulator valve 80 establishes main pressure at the low regulated value in main line 78 since there is no main pressure boost signal to valve 80 with the manual selector valve in this position. This low main pressure is delivered to the manual selector valve 114, the modulator valve 158 and the power take off valve 131. The manual selector valve 114 blocks delivery of the low main pressure to the shift valves 192 and 212 and thus there is no drive produced through the transmission from the input shaft 14 to the output shaft 16 while the converter 10 is charged with fluid from the main pressure regulator valve 80 via the converter feed line 108. With the converter filled, the fluid exits from the converter via the converter return line 110 which directs it through the cooler 111 and thence to lubricate the friction parts of the transmission with the lubrication pressure being determined by valve 112, the fluid after these uses being returned to sump 71. With the engine idling, manifold vacuum is at its highest value (largest negative pressure) and the modulator valve 158 establishes the minimum TV pressure in TV line 166 utilizing fluid from main line 78. The TV pressure is delivered by the TV line 166 to the two shift valves 192 and 212 to ready them for subssequent shifting between the forward drives.

In neutral, the power take off valve 131 may be operated by the operator closing the switch 152 to connect the main line 78 to the power take off clutch feed line 144 to engage the power take off clutch 68. The auxiliary load is generally different and smaller than the load on the transmission output shaft 16. The pressure regulator bias of the power take off valve is determined to provide a reduced regulated pressure in line 144 to operate the power take off drive fluid motor 69 so that the engagement capacity of clutch 68 is sufficient but not excessive to efficiently meet the maximum auxiliary load. Since downstream pressure regulation is provided by valve 131, the pressure delivered to engage the power take off clutch 68 will remain constant whenever main pressure is boosted to its high value. This prevents excessive engagement capacity at the power take off clutch to effect an increase in over-all transmission efficiency. Since the fluid supply for the power take off clutch is taken directly from the main line 78 and therefore is not dependent upon the positioning of the manual selector valve 114, the power take off valve 131 may be operated to establish the power take off drive in all transmission drives in addition to in the neutral transmission condition as described above.

DRIVE POSITION

When the operator moves the manual selector valve 114 to its D position, the main line 78 is then connected to range feed line 126. With the vehicle at rest and therefore no pressure in governor line 191, both of shift valves 192 and 212 are in their downshift position. Thus, the range feed line 126 is connected by the 2–3 shift valve 192 to the 1–2 shift valve 212 via the 1–2 feed line 202 and the latter valve in turn connects thet 1–2 feed line to the low drive brake feed line 224 to engage the low drive brake 34 to establish the low drive to output shaft 16.

The trimmer valve 236, having been in its steady state neutral condition, now receives fluid from the main line as fluid flows through the flow restriction 211 to feed the low drive fluid motor 36. The trimmer valve 236 causes the pressure in the 1–2 feed line downstream of the flow restriction 211 and thus in the low drive fluid motor 36 to build slowly to full main pressure which is boosted to its high value for the large torque demand in low drive by the main pressure bias now added to the main pressure regulator valve 80 via the low drive brake feed line 224, underlap valve 260 and boost signal line 269. Since TV pressure is at its minimum value, assuming the engine is still idling, the initial trim pressure level is thus at its lowest value and therefore pressure buildup is at the slowest rate and provides a very smooth engagement of the low drive brake 34. After the buildup in pressure has been completed, the trimmer valve 236 is then conditioned in its steady state shifted condition.

With low drive thus established, and when the engine is accelerated by operation of the throttle pedal 175, the output shaft 16 will start to turn which causes governor pressure to then be produced in governor line 191 to urge an upshift of both shift valves 192 and 212. Acceleration of the output shaft 16 increases the governor pressure and when the speed is sufficient to require operation of the intermediate drive, the governor pressure upshift bias conditions the 1–2 shift valve 212 in its upshift position to effect disengagement of the low drive brake 34 and engagement of the intermediate drive brake 46 by connecting the low drive brake feed line 224 to the 1–2 exhaust line 210 and connecting the 1–2 feed line 202 to the intermediate drive brake feed line 226. With the low drive brake feed line 224 thus relieved of pressure, the pressure boost signal to the main pressure regulator valve 80 is also relieved so that the main pressure is reduced to its low value and will remain there in intermediate and high drive.

This automatic upshift is affected by TV pressure which opposes the upshift governor pressure bias. The minimum TV pressure increases with increasing torque demand and opposes the governor bias to require a higher governor pressure bias and thus higher transmission output speed with higher torque demand for the automatic upshift to intermediate drive.

At the initiation of the upshift to intermediate drive, the trimmer valve 236 is in its steady state shifted condition and with the supply of fluid to the intermediate drive fluid motor 48, pressure drops in the 1–2 feed line 202 downstream of orifice 211 resulting in the valve element 251 in the trimmer valve 236 moving upward to fully open bore 250 to chamber 246 thereby causing rapid conditioning of the trimmer valve 236 in its steady state neutral condition. Then when pressure builds in the 1–2 feed line 202 downstream of orifice 211, the trimmer valve 236 then acts to increase the pressure to full main line pressure from some minimum regulated trim level determined by spring 244 and the TV bias acting on the trimmer valve element 237. This minimum trim level thus increases with increasing TV pressure bias so that with power shifting, the time for full pressure build up decreases with increasing TV pressure bias or engine torque demand with smooth drive engagement effected by an engagement capacity matched to the torque demand. When the pressure buildup has been completed, the trimmer valve 236 then resumes its steady state shifted condition in readiness for a subsequent shift using pressure from the 1–2 feed line 202.

When the transmission output speed is sufficient to require engagement of the high drive, the governor pressure upshift bias conditions the 2–3 shift valve 192 in its upshift position to effect disengagement of the intermediate drive brake 46 and engagement of the high drive clutch 51 by connecting the intermediate drive brake feed line 226 to the 1–2 exhaust line 210 and connecting the drive range line 126 to the high drive clutch feed line 203. Again, automatic upshifting is affected by TV pressure which opposes the governor pressure bias on the 2–3 shift valve to require a higher governor pressure bias and thus higher transmission output speed with higher torque demand for the automatic upshift which in this case is to high drive. On establishment of high drive with the 1–2 feed line 202 connected to the 1–2 exhaust line 210, the trimmer valve 236 is then conditioned in its steady state neutral condition because of the loss of main pressure at this valve, and thus is conditioned to trim on a downshift from high to intermediate drive.

Downshifting by automatic operation is similar to upshifting but occurs in reverse sequence, the two shift valves moving to their downshift position progressively (the 2–3 shift valve 192 and then the 1–2 shift valve 212), the governor pressure being required to decrease to allow these valves to move to their downshift position. The trimmer valve 236 trims on the downshift to intermediate drive this time starting from its steady state neutral condition like in the shift from neutral to low drive and trims on the downshift to low drive starting from its steady state shifted condition like in the shift from low to intermediate drive. Automatic downshifting of the shift valves is hastened by the delivery of T pressure to the shift valves from the secondary modulator pressure supply valve 178 which makes this pressure delivery available above a predetermined intermediate TV pressure which may correspond to half open engine throttle, for example, indicating high torque demand. Thus, when T pressure is present indicating high torque demand, downshifting from high to intermediate drive and from intermediate to low drive is made to occur earlier with the downshift forces for these events increasing with increasing high torque demand.

Forced downshifting of the shift valves 192 and 212 may be made to occur by the operator pressing the accelerator pedal 175 through detent to close switch 174 to energize solenoid valve 169 of the modulator valve 158. With solenoid valve 169 energized, full main pressure is then delivered to TV line 166 which in turn delivers the main pressure to provide a forced downshift bias on each of the shift valves 192 and 212. A forced downshift to intermediate drive occurs by operation of the 2–3 shift valve 192 when the governor pressure and thus the transmission output speed is at a speed suitable to the intermediate drive's output speed range. Similarly, the forced downshift base operating on the 1–2 shift valve 212 will force a downshift from intermediate to low drive when the transmission output speed is suitable to the low drive's output speed range.

INTERMEDIATE POSITION

When the manual selector valve 114 is positioned in its I position the range feed line 126 remains connected to main feed line 78 and the latter line is additionally connected to the intermediate drive signal line 127. Assuming the 2–3 shift valve 192 is downshifted, main pressure in signal line 127 is directed to act on land a of the 2–3 shift valve element 193 to hold it in its downshift position against the highest governor pressure bias available in the intermediate drive's output speed range. If the 2-3 shift valve 192 is upshifted prior to such positioning of the manual selector valve 114, the 2-3 shift valve 192 must downshift before this holding downshift biasing force becomes available. Thus, in the I position of the manual selector valve 114, the control system provides for automatic shifting between low and intermediate drive as described previously and prevents an upshift high drive. This control system condition is established immediately when either the low or intermediate drive is already established and also after an automatic downshift from high to intermediate drive when the latter drive is engaged at the time of placing the manual selector valve in the I position.

LOW POSITION

When the manual selector valve 114 is moved to the L position, the main line 78 is connected to the low drive signal line 128 while the range feed line 126 and intermediate drive signal line 127 remain connected to main line 78. Assuming the 1-2 shift valve 212 is downshifted, main pressure is directed by signal line 128 to act on land *a* of the 1-2 shift valve element 213 to hold this valve in its downshift position against the highest governor pressure bias available in the low drive's output speed range. On the other hand, when the 1-2 shift valve 212 is upshifted, this valve must automatically downshift before this holding downshift bias is effected. Since the holding down-shift bias for the 2-3 shift valve 192 is also available in this selector valve position, its operation in the L position is like that previously described in the I position. Thus, in the L position of the manual selector valve 114 and assuming the 1-2 shift valve 212 is already downshifted, this shift valve will be held in its downshift position to maintain low drive, i.e. prevents an upshift. If the 1-2 shift valve 212 is upshifted and the 2-3 shift valve 192 is downshifted on selection of the L position, the 1-2 shift valve 212 must automatically downshift as previously described before low drive can be held. When the 2-3 shift valve 192 and 1-2 shift valve 212 are both upshifted upon selection of the L position, both these valves must progressively automatically downshift before low drive is established and held.

REVERSE POSITION

When the manual selector valve 114 is moved to its R position, the main feed line 78 is connected by this valve to only the reverse drive brake feed line 124 to effect engagement of the reverse drive brake 60 by feeding main pressure to the reverse drive fluid motor 61. Since the trimmer valve 236 operates on only the 1-2 feed line 202, it has no effect on the pressure build up to engage the reverse drive. Fluid pressure in the reverse drive brake feed line 124 is also directed to act on the underlap valve 260 to position this valve to connect line 124 to boost signal line 269. This pressure delivery to the boost signal line 269 causes the main pressure regulator valve 80 to boost the main pressure to its high value for reverse drive operation where torque demand is high.

The above described preferred embodiment is illustrative of the invention which may be modified within the scope of the appended claims.

We claim:

1. In a transmission control system for a transmission powered by an engine and having both a main drive and an auxiliary drive, the combination of a main drive fluid motor and an auxiliary drive fluid motor which are operable on separate fluid pressure supply thereto to respectively establish a main drive and an auxiliary drive, a source of fluid under pressure, governor means using fluid from said source for providing a governor pressure increasing with increasing main drive output speed, regulator valve means for regulating the pressure of said fluid at a predetermined main pressure, modulator valve means having an engine torque demand bias and using fluid at said main pressure for providing a shift control pressure increasing with increasing torque demand utilizing a bias provided by said shift control pressure to oppose said torque demand bias, shift valve means operable in a drive establishing condition to deliver fluid at said main pressure to said main drive fluid motor and operable in a drive release condition to relieve the pressure in said main drive fluid motor, said shift valve means being biased by said governor pressure to one of said conditions and biased by said shift control pressure to the other condition, engine throttle linkage, said modulator valve means including electrically controlled valve means operated by said engine throttle linkage only when said linkage is in a condition corresponding to at least full engine throttle opening for relieving said shift control pressure bias on said modulator valve means to raise said shift control pressure to said main pressure, trimmer valve means having a variable bias provided by said shift control pressure for controlling the rate of pressure build up in said main drive fluid motor on fluid supply thereto according to torque demand, and manually operated auxliary drive control means including regulator valve means operable to both reduce said main pressure to a predetermined lower value and deliver the fluid at this low pressure to said auxiliary drive fluid motor in a drive establishing condition and operable to relieve the pressure in said auxilary drive fluid motor in a drive release condition.

2. In a transmission control system for a transmission powered by an engine the combination of a fluid motor which is operable on fluid pressure supply thereto to provide a transmission drive, a source of fluid under pressure, governor means using fluid from said source for providing a gocernor pressure increasing with increasing transmission drive output speed, regulator valve means for regulating the pressure of said fluid at a predetermined main pressure, modulator valve means having an engine torque demand bias and using fluid at said main pressure for providing a shift control pressure increasing with increasing torque demand utilizing a bias provided by said shift cotnrol pressure to oppose said torque demand bias, shift valve means operable in a drive establishing condition to deliver fluid at said main pressure to said fluid motor and in a drive release condition to relieve the pressure in said fluid motor, said shift valve means being biased by said governor pressure to one of said conditions and biased by said shift control pressure to the other condition, engine throttle linkage, and said modulator valve means including electrically controlled valve means operated by said engine throttle linkage only when said linkage is in a condition corresponding to at least near full engine throttle opening for relieving said shift control pressure bias on said modulator valve means to raise said shift control pressure to said main pressure.

3. In a transmission control system for a transmission powered by an engine the combination of a fluid motor operable on fluid pressure supply thereto to establish a transmission drive, a source of fluid under pressure, regulator valve means for regulating the pressure of said fluid at a predetermined value, drive control means for controlling the delivery of said fluid to said fluid motor, modulator valve means including engine torque demand biasing means and using fluid at said predetermined pressure for providing a control pressure increasing with increasing engine torque demand, and trimmer valve means comprising a pressure regulator valve element having a variable bias provided by said control pressure acting directly on said pressure regulator valve element for controlling the rate of pressure build up in said fluid motor on fluid supply thereto according to torque demand.

4. The transmission control system defined in claim 3 and said trimmer valve means including a fixed pressure regulator bias operable to establish an initial low regulated pressure to initiate operation of said fluid motor with said variable control pressure bias adding to said fixed pressure regulator bias to both increase said initial low regulated pressure with increasing torque demand and increase the rate of pressure build up in said fluid motor on fluid supply thereto with increasing torque demand.

5. In a transmission control system for a transmission having both a main drive and auxiliary drive the combination of a main drive fluid motor and an auxiliary drive fluid motor which are operable on separate fluid pressure supply thereto to respectively establish a main output drive and an auxiliary drive, a source of fluid under pressure, regulator valve means operable to regulate the pressure of said fluid at a predetermined value, main drive control means for controlling the delivery of fluid at said predetermined pressure to said main drive fluid motor, and manually operated auxiliary drive control means including pressure regulator valve means operable to both reduce said predetermined pressure to a predetermined lower regulated value and deliver the fluid at this predetermined low pressure to said auxiliary drive fluid motor in a drive establishing condition and operable to relieve the pressure in said auxliary drive fluid motor in a drive release condition.

6. The transmission control system defined in claim 5 and said auxiliary drive control means having a bias provided by the higher predetermined pressure to normally establish said release condition and electrically controlled valve means operated manually to relieve said high pressure bias on said auxiliary drive control means to effect said drive establishing condition.

References Cited
UNITED STATES PATENTS

| | | | |
|---|---|---|---|
| 2,809,536 | 10/1957 | O'Malley | 74—868 |
| 2,832,231 | 4/1958 | Edsall | 74—868 |
| 3,293,935 | 12/1966 | Tuck et al. | 74—868 |
| 3,398,607 | 8/1968 | Chana | 74—868X |
| 3,400,613 | 10/1968 | Johnson et al. | 74—869 |

ARTHUR T. McKEON, Primary Examiner

U.S. Cl. X.R.

74—15.82

PO-1050
(5/69)

UNITED STATES PATENT OFFICE
CERTIFICATE OF CORRECTION

Patent No. __3,546,974__      Dated __December 15, 1970__

Inventor(s) __Joseph R. Fox, Robert H. Schaefer__

It is certified that error appears in the above-identified patent and that said Letters Patent are hereby corrected as shown below:

Column 2, line 4, "hrottle" should read -- throttle --.
Column 6, line 25, "contiuously" should read -- continuously
Column 7, line 15, "increase" should read -- increases --.
Column 8, line 19, "contract" should read -- contact --; line 58, "On" should read -- In --; line 60, cancel "198 blocks TV line 166 from chamber 206 so that the". Column 9, line 35, "downsihft" should read -- downshift --. Column 10, line 9, cancel beginning with "spring 221 and" to and including "the TV pressure" in Column 10, line 14, and insert therefor -- governor plug 216 is greater than the downshift bias of sprin 221 and TV pressure acting on downshift plug 219. In the up position, downshift plug 219 blocks TV line 166 from chamber so that the TV pressure previously acting on this plug is the relieved through --. Column 11, line 69, "compises" should -- comprises --. Column 12, line 52, "subssequent" should r -- subsequent --. Column 13, line 11, "thet" should read -- the --. Column 14, line 61, "base" should read -- bias --. Column 16, line 20, "auxliary" should read -- auxiliary --; 23, "low" should read -- lower --; line 25, "auxilary" shoul read -- auxiliary --; line 32, "gocernor" should read -- gov --; line 39, "cotnrol" should read -- control --. Column 17 line 20, "auxliary" should read -- auxiliary --.

Signed and sealed this 6th day of April 1971.

(SEAL)
Attest:

EDWARD M. FLETCHER, JR.
Attesting Officer

WILLIAM E. SCHUYLER,
Commissioner of Paten